(12) United States Patent
Sen et al.

(10) Patent No.: US 8,712,180 B2
(45) Date of Patent: Apr. 29, 2014

(54) SYSTEM AND METHODS FOR RANDOM PARAMETER FILTERING

(75) Inventors: Pradeep Sen, Albuquerque, NM (US); Aliakbar Darabi, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 13/980,230

(22) PCT Filed: Jan. 17, 2012

(86) PCT No.: PCT/US2012/021493
§ 371 (c)(1),
(2), (4) Date: Oct. 16, 2013

(87) PCT Pub. No.: WO2012/099843
PCT Pub. Date: Jul. 26, 2012

(65) Prior Publication Data
US 2014/0029849 A1    Jan. 30, 2014

Related U.S. Application Data

(60) Provisional application No. 61/433,361, filed on Jan. 17, 2011, provisional application No. 61/464,422, filed on Mar. 4, 2011, provisional application No. 61/477,702, filed on Apr. 21, 2011.

(51) Int. Cl.
*G06K 9/40*      (2006.01)
*G06T 5/00*      (2006.01)

(52) U.S. Cl.
CPC .................................... *G06T 5/001* (2013.01)
USPC ............................ 382/260; 382/162; 382/167

(58) Field of Classification Search
CPC ............. G06T 5/001; G06T 5/20; G06T 5/50; G06T 11/001; G06T 7/408; G06T 5/40; G06K 9/40; H04N 5/21; H04N 1/6058; H04N 9/045; H04N 1/6027; H04N 1/60
USPC ........ 382/237, 260, 162, 167; 381/94.2, 94.3; 358/1.16, 1.9, 3.03; 704/226
See application file for complete search history.

(56) References Cited

U.S. PATENT DOCUMENTS

| | | | |
|---|---|---|---|
| 6,792,073 B2 | 9/2004 | Deasy et al. | |
| 7,103,541 B2 * | 9/2006 | Attias et al. | 704/226 |
| 7,813,581 B1 | 10/2010 | Fitzpatrick et al. | |
| 8,023,152 B2 * | 9/2011 | Li et al. | 358/3.03 |
| 8,411,310 B2 * | 4/2013 | Yang et al. | 358/1.16 |
| 2008/0150938 A1 | 6/2008 | Pantaleoni | |

FOREIGN PATENT DOCUMENTS

KR     1020090085419     8/2009

* cited by examiner

*Primary Examiner* — Anh Do
(74) *Attorney, Agent, or Firm* — Valauskas Corder LLC (57) ABSTRACT

The invention produces a higher quality image from a rendering system based on a relationship between the output of a rendering system and the parameters used to compute them. Specifically, noise is removed in rendering by estimating the functional dependency between sample features and the random inputs to the system. Mutual information is applied to a local neighborhood of samples in each part of the image. This dependency is then used to reduce the importance of certain scene features in a cross-bilateral filter, which preserves scene detail. The results produced by the invention are computed in a few minutes thereby making it reasonably robust for use in production environments.

10 Claims, 7 Drawing Sheets

| | |
|---|---|
| $n$ | number of random parameters used to render the scene |
| $m$ | number of scene features available in the feature vector |
| $s$ | number of samples per pixel |
| $\mathbf{x}_i$ | sample vector containing the features of the $i^{th}$ sample |
| $\mathbf{p}_i$ | the floating-point $(x, y)$ position of the $i^{th}$ sample on the screen |
| $\mathbf{r}_i$ | $n \times 1$ vector of random parameters used to compute the $i^{th}$ sample |
| $\mathbf{f}_i$ | $m \times 1$ vector of scene features associated with the $i^{th}$ sample |
| $\mathbf{c}_i$ | original color vector of the $i^{th}$ sample |
| $\bar{\mathbf{v}}$ | vector with mean removed and normalized by standard deviation |
| $D_{\mathbf{q}}^{\mathbf{v}}$ | dependency of $\mathbf{q}$ on $\mathbf{v}$ |
| $W_{\mathbf{c},k}^{\mathbf{r}}$ | fractional contribution of *all* random parameters on the $k^{th}$ color channel |
| $W_{\mathbf{f},k}^{\mathbf{r}}$ | fractional contribution of *all* random parameters on the $k^{th}$ scene feature |
| $W_{\mathbf{c}}^{\mathbf{f},k}$ | fractional contribution of the $k^{th}$ scene feature on *all* color channels |
| $w_{ij}$ | weight that sample $j$ contributes to sample $i$ ($w_{ij} \neq w_{ji}$). |
| $\mathbf{c}_i'$ | final filtered color vector of the $i^{th}$ sample |
| $\mathcal{P}$ | a pixel in the image representing a set of $s$ samples |
| $\mathcal{N}$ | set that defines the neighborhood of samples used for filtering the samples |
| $\mathbf{m}_{\mathcal{Q}}^{\mathbf{v}}$ | vector with per-element mean of vector $\mathbf{v}$ over set $\mathcal{Q}$ |
| $\sigma_{\mathcal{Q}}^{\mathbf{v}}$ | vector with per-element standard deviation of vector $\mathbf{v}$ over set $\mathcal{Q}$ |
| $t$ | number of the iteration in our multi-pass filtering approach |
| $M$ | maximum number of samples in neighborhood $\mathcal{N}$ |

FIG. 3

Input: scene to render and $s$ the number of samples/pixel
Output: final image
1: Render scene with $s$ samples/pixel and output sample vector $\mathbf{x}$ for every sample [Sec. 3.1]
2: for all samples $i$ in image $\mathcal{I}$ do
3:     $\mathbf{c}'_i \leftarrow \mathbf{c}_i$
4: end for

5: $box = \{55, 35, 17, 7\}$ [Sec. 3.2]
6: for iteration step $t = 0, 1, 2, 3$ do
7:     box size $b = box[t]$
8:     max number of samples $M \leftarrow b^2 \times s/2$
9:     for all pixels $\mathcal{P}$ in image $\mathcal{I}$ do
10:       $\mathcal{N} \leftarrow$ Pre-process Samples($\mathcal{P}, b, M$) [Sec. 4]
11:       $\{\alpha, \beta\} \leftarrow$ Compute Feature Weights($t, \mathcal{N}$) [Sec. 5]
12:       $\mathbf{c}'' \leftarrow$ Filter Color Samples($\mathcal{P}, \mathcal{N}, \alpha, \beta, \mathbf{c}'$) [Sec. 6]
13:     end for
14:     for all samples $i$ in image $\mathcal{I}$ do
15:       $\mathbf{c}'_i \leftarrow \mathbf{c}''_i$
16:     end for
17: end for

*/\* all samples in image $\mathcal{I}$ have been filtered... box filter to compute final pixel values \*/*
18: for all pixels $\mathcal{P}$ in image $\mathcal{I}$ do
19:     Box filter samples in pixel $\mathcal{P}$ to compute final pixel value
20: end for
21: return final image

FIG. 4

Input: set of samples in pixel $\mathcal{P}$, box size $b$, maximum number of samples $M$
Output: set of samples in neighborhood $\mathcal{N}$ 1:   $\sigma_p \leftarrow b/4, \mathcal{N} \leftarrow \mathcal{P}$
2:   Compute mean $(m_{\mathcal{P}}^f)$ and standard deviation $(\sigma_{\mathcal{P}}^f)$ of the features of samples in pixel $\mathcal{P}$ for clustering     /* add samples to neighborhood $\mathcal{N}$ */
3:   for $q = 1$ to $M - s$ do
4:     Select a random sample $j$ from samples inside the box but outside $\mathcal{P}$ with distribution based on $\sigma_p$ [Sec. 4.1]
5:     $flag \leftarrow 1$       /* perform clustering [Sec. 4.2] */
6:     for scene feature $k = 1$ to $m$ do
7:       if $|f_{j,k} - m_{\mathcal{P},k}^f| > \{3|30\}\sigma_{\mathcal{P},k}^f$ and
          $|f_{j,k} - m_{\mathcal{P},k}^f| > 0.1$ or $\sigma_{\mathcal{P},k}^f > 0.1$ then
8:         $flag \leftarrow 0$
9:         break
10:      end if
11:     end for
12:     if $flag$ equals to 1 then
13:       $\mathcal{N} \leftarrow$ sample $j$
14:     end if
15: end for

/* neighborhood $\mathcal{N}$ now ready for statistical analysis */

/* compute normalized vector for each sample by removing mean and dividing by standard deviation [Sec. 4.3] */
16: Compute mean $(m_{\mathcal{N}}^x)$ and standard deviation $(\sigma_{\mathcal{N}}^x)$ of samples in neighborhood $\mathcal{N}$
17: for all samples $i$ in $\mathcal{N}$ do
18:     $\bar{x}_i \leftarrow (x_i - m_{\mathcal{N}}^x)/\sigma_{\mathcal{N}}^x$
19: end for

20: return set of samples in neighborhood $\mathcal{N}$

FIG. 5

Input: iteration step $t$, set of samples in neighborhood $\mathcal{N}$
Output: color weights $\alpha$ and feature weights $\beta$ for bilateral filter /* Compute the dependencies for the colors using the samples in $\mathcal{N}$ */
1: for color channel $k = 1$ to 3 do
2:     for random parameter $l = 1$ to $n$ do
3:         $D_{c,k}^{r,l} \leftarrow \mu(\bar{c}_{\mathcal{N},k}; \bar{r}_{\mathcal{N},l})$ with Eq. 1
4:     end for
5:     Calculate $D_{c,k}^{r}$ with Eq. 4 using the $D_{c,k}^{r,l}$ terms 6:     for position parameter $l = 1$ to 2 do
7:         $D_{c,k}^{p,l} \leftarrow \mu(\bar{c}_{\mathcal{N},k}; \bar{p}_{\mathcal{N},l})$ with Eq. 1
8:     end for
9:     Calculate $D_{c,k}^{p}$ with Eq. 5 using the $D_{c,k}^{p,l}$ terms 10:     for scene feature $l = 1$ to $m$ do
11:         $D_{c,k}^{f,l} \leftarrow \mu(\bar{c}_{\mathcal{N},k}; \bar{f}_{\mathcal{N},l})$ with Eq. 1
12:     end for
13:     Calculate $D_{c,k}^{f}$ with Eq. 6 using the $D_{c,k}^{f,l}$ terms 14:     Calculate $W_{c,k}^{r}$ with Eq. 10 using $D_{c,k}^{r}$ and $D_{c,k}^{p}$ /* I now have everything I need to compute $\alpha_k$ */
15:     $\alpha_k \leftarrow \max(1 - 2(1 + 0.1t)W_{c,k}^{r}, 0)$
16: end for

17: Calculate $D_c^r$ and $D_c^p$ and $D_c^f$ by adding up the $D_{c,k}^{r}$, $D_{c,k}^{p}$, and $D_{c,k}^{f}$ terms over the three color channels with Eq. 8

/* Compute the dependencies for the scene features using samples in $\mathcal{N}$ */
18: for scene feature $k = 1$ to $m$ do
19:     for random parameter $l = 1$ to $n$ do
20:         $D_{f,k}^{r,l} \leftarrow \mu(\bar{f}_{\mathcal{N},k}; \bar{r}_{\mathcal{N},l})$ with Eq. 1
21:     end for
22:     Calculate $D_{f,k}^{r}$ with Eq. 2 using the $D_{f,k}^{r,l}$ terms 23:     for position parameter $l = 1$ to 2 do
24:         $D_{f,k}^{p,l} \leftarrow \mu(\bar{f}_{\mathcal{N},k}; \bar{p}_{\mathcal{N},l})$ with Eq. 1
25:     end for
26:     Calculate $D_{f,k}^{p}$ with Eq. 3 using the $D_{f,k}^{p,l}$ terms 27:     Calculate $D_c^{f,k}$ with Eq. 7 using the $D_{c,l}^{f,k}$ terms from line 11

28:     Calculate $W_{f,k}^{r}$ with Eq. 9 using $D_{f,k}^{r}$ and $D_{f,k}^{p}$ 29:     Calculate $W_c^{f,k}$ with Eq. 12 using $D_c^{f,k}$, $D_c^r$, $D_c^p$, and $D_c^f$ 30:     $\beta_k \leftarrow W_c^{f,k} \cdot \max(1 - (1 + 0.1t)W_{f,k}^{r}, 0)$
31: end for

32: return $\alpha$ and $\beta$

FIG. 6

Input: set of samples in pixel $\mathcal{P}$, set of samples in neighborhood $\mathcal{N}$, color $\alpha$ and feature weights $\beta$, and previous sample colors $\mathbf{c}'$
Output: filtered color of the samples $\mathbf{c}''$ 1: Calculate $W_c^r$ with Eq. 11 using the $W_{c,k}^r$ terms from line 14 in Alg. 3
2: $\sigma^2 \leftarrow 8\sigma_8^2/s$
3: $\sigma_c^2 = \sigma_f^2 \leftarrow \frac{\sigma^2}{(1-W_c^r)^2}$ /* filter the colors of samples in pixel $\mathcal{P}$ using bilateral filter */
4: for all samples $i$ in $\mathcal{P}$ do
5:    $\mathbf{c}_i'' \leftarrow 0, w \leftarrow 0$
6:    for all samples $j$ in $\mathcal{N}$ do
7:       Calculate $w_{ij}$ with Eq. 18 using $\alpha$ and $\beta$
8:       $\mathbf{c}_i'' \leftarrow \mathbf{c}_i'' + w_{ij}\mathbf{c}_j'$
9:       $w \leftarrow w + w_{ij}$
10:    end for
11:    $\mathbf{c}_i'' \leftarrow \mathbf{c}_i''/w$
12: end for

/* address issues with HDR [Sec. 6.1] */
13: Compute mean $\mathbf{m}_\mathcal{P}^{\mathbf{c}''}$ and std. dev. $\sigma_\mathcal{P}^{\mathbf{c}''}$ of filtered colors
14: for all samples $i$ in $\mathcal{P}$ do
15:    for color channel $k = 1$ to 3 do
16:       if $(\mathbf{c}_{i,k}'' - \mathbf{m}_{\mathcal{P},k}^{\mathbf{c}''}) > \sigma_{\mathcal{P},k}^{\mathbf{c}''}$ then
17:          $\mathbf{c}_{i,k}'' \leftarrow \mathbf{m}_{\mathcal{P},k}^{\mathbf{c}''}$
18:       end if
19:    end for
20: end for
21: return filtered color of the samples $\mathbf{c}''$

FIG. 7

SYSTEM AND METHODS FOR RANDOM PARAMETER FILTERING

This application claims the benefit of the following: U.S. Provisional Patent Application No. 61/433,361 filed Jan. 17, 2011, U.S. Provisional Patent Application No. 61/464,422 filed Mar. 4, 2011, and U.S. Provisional Patent Application No. 61/477,702 filed Mar. 21, 2011.

FIELD OF THE INVENTION

The invention relates generally to computer graphics. More particularly, the invention relates to a system and methods for image rendering in and by digital computing systems, such as computer graphics systems and methods for motion pictures and other applications.

BACKGROUND OF THE INVENTION

High-end film applications require the synthesis of high-quality imagery that is often photorealistic or matches a desired artistic style. One approach for synthesizing high-quality imagery is known as Monte Carlo rendering, which simulates the physical process of how light flows through the scene and exposes a piece of film in the camera. Monte Carlo rendering is advantageous since it is physically correct, i.e., it correctly simulates the physics of how light bounces around the walls and reflects off the surfaces like it does in the real world. Therefore to make a scene look realistic, all that is needed is light sources positioned in the proper places when building the computer model of the scene. Monte Carlo rendering produces a beautiful image that looks realistic because it has correctly simulated how light bounces around in the scene.

Although Monte Carlo rendering can produce beautiful, photorealistic images, a disadvantage is that it usually takes a long time—up to a day per image—to produce high-quality results which make it unacceptable for real-world production environments such as computer-generated film production. Running the Monte Carlo rendering algorithm for just a few minutes by using only a small number of samples per pixel results in an image that is very noisy and unusable for high-end film applications. For example, for a high resolution frame like those required in the movies could take more than a day per frame to calculate the final image. Considering a 2-hour digital movie at 24 frames per second that has 172,800 individual image frames, it would take 473 years to generate all the frames for a movie using Monte Carlo rendering. Movies are iterative creative processes, so shots often have to be done over and over, and since the production schedule is usually around a year, this technology is simply not feasible for feature film production. Therefore, Monte Carlo rendering is too time-consuming and difficult to incorporate into high-end film applications.

Although Monte Carle rendered scenes may look good from any angle, doing something as simple as moving the camera or moving an object on a virtual set would require hours of manual labor to ensure the lighting is correct. Monte Carlo rendering systems can produce beautiful, photorealistic images by simulating light transport through a series of multidimensional integrals at every pixel of the image: integration of the radiance over the aperture of the camera, over the area light sources of the scene, over the time the shutter is open, and even over the pixel for antialiasing. Monte Carlo renderers estimate these integrals by taking many point samples of the scene function—functional representation of the ray-tracing system given a specific scene. This sampling process involves tracing rays with sets of random parameters that correspond to the dimensions of integration, e.g., the moment in time of the ray for motion blur, the position of the ray on the aperture of the camera for depth-of-field, and so on. In path-tracing, the Monte Carlo system integrates over randomly selected paths from the camera's image plane through the scene in order to compute full global illumination effects.

If the scene function is evaluated at enough of these multidimensional samples, the Monte Carlo rendering system will converge to the actual value of the integral, resulting in a physically correct image. Unfortunately, the variance of the estimate of the integral decreases with the number of samples, so a large number of samples are needed to get a noise-free result. Thus, although a very noisy approximation of the final image can be obtained in a few minutes, it takes a long time—as much as a day per image—to get a result that is acceptable for high-end rendering applications. This limits the use of Monte Carlo rendering systems in modern digital film production.

One way to address these problems is to apply a noise reduction filter to the noisy image. However, the fundamental problem is that filters cannot easily determine what is unwanted noise (introduced by the Monte Carlo integration process) and what is valid scene content, since scene content can often have a noisy appearance in and of itself.

Bilateral filters can be applied to preserve edges in the image by blending samples using weights computed from the differences in position as well as sample value, thereby avoiding blending samples together whose values differ greatly. Unfortunately, bilateral filters work poorly for filtering general Monte Carlo noise. As an example, a depth-of-field scene including three quads of noisy textures, with only the closest quad in focus, the Monte Carlo integration process produces noise in the blurred regions because rays from a pixel in these areas hit different parts of the quads and therefore have widely varying colors when rendered at 8 samples/pixel. A bilateral filter that uses the sample color to preserve the texture detail in the in-focus quad would also preserve the depth-of-field noise, because, in this example, the color variations for both are very similar explaining why previous methods that use scene features for bilateral filtering do not work for general Monte Carlo effects. Noise has always been a problem associated with Monte Carlo approaches of image rendering.

Attempts to solve the noise problem associated with Monte Carlo rendering include filtering Monte Carlo noise and reducing the source of Monte Carlo noise. Nonlinear filters have been developed to filter Monte Carlo noise such as alpha-trimmed filters (which discard statistical outliers and average the remaining samples). One proposed nonlinear filter spreads out the contribution of "noisy" samples to smooth out the signal. The noisy samples are identified by finding pixels where the variance is still above a threshold after a certain amount of time. Another proposed attempt to filter Monte Carlo noise includes filtering Monte Carlo renderings by filtering the low-frequency indirect illumination separately from the rest of the image. Filters based on anisotropic diffusion have also been proposed to filter Monte Carlo noise by preserving details in the image using a map of image coherence with color, depth, and normal information.

In addition, a modified bilateral filter has been proposed to compare the range values of a Gaussian-filtered version of the image. Yet filtering global illumination has also been proposed using a geometry-based discontinuity buffer to adjust a filter. More recently, the edge-avoiding Á-Trous filter has been proposed that incorporates a wavelet formulation into the bilateral filter including adding additional information such as normal and world position to help identify edges in the scene. Overall, the problem with these approaches to filtering Monte Carlo noise is that scene information such as normals and world positions can be corrupted by Monte Carlo noise in effects such as depth-of-field and motion blur, so filters that rely on variations in these values to preserve scene detail cannot denoise these kinds of scenes. This is why these approaches have all focused on denoising irradiance or other forms of global illumination, where the geometry scene information at each sample is unaffected by the random parameters. What is needed is an approach to reduce Monte Carlo noise that can handle general Monte Carlo effects with the same framework.

The source of the noise in Monte Carlo rendering has also been studied in order to develop algorithms to mitigate the problem. For example, it has been studied how to extend non-uniform sampling patterns from 2D to the number of dimensions of the random parameters in order to improve the quality of the final image. Other attempts to reduce the source of Monte Carlo noise introduced new Monte Carlo-based rendering algorithms with lower variance, such as irradiance caching, photon mapping, and multidimensional light cuts. Other attempts reduced the noise by fitting a smooth basis to the noisy data. Multidimensional sampling and the reconstruction problem has also been studied with respect to the source of Monte Carlo noise. A multidimensional adaptive sampling algorithm has been proposed, which adaptively samples the space in all parameter dimensions and can handle a wide range of Monte Carlo effects, but unfortunately suffers from the curse of dimensionality as the number of parameters grows.

Another general method is known as adaptive wavelet rendering, which positions samples based on the variance of a wavelet basis's scale coefficients and reconstructs the final image using a wavelet approximation. This smooths noisy areas and preserves detail, although it produces wavelet artifacts when the sampling rate is low. Adaptive wavelet rendering claims to distinguish between the two sources of image-space variance—scene features and Monte Carlo noise—using the wavelet coefficients. However, the proposed method would not work for depth-of-field scenes since in image space the Monte Carlo noise is similar to the noisy texture detail.

Other attempts to reduce the source of Monte Carlo noise uses transform domain analysis to optimize the adaptive placement of samples for specific Monte Carlo effects. For example, the Fourier domain has been used to efficiently render depth-of-field effects, while frequency-space analysis has been leveraged to develop a sheared filter and sampling method for motion blur. However, these attempts cannot be applied to various effects. Recently, compressed sensing has been used to reconstruct scene signal assuming that it is sparse in a transform domain. This method is not an adaptive-sampling algorithm, but a post-process reconstruction. Unfortunately, compressed sensing methods still need a considerable number of samples to produce good results. Information theory has also been applied to improve ray tracing using adaptive methods, where the entropy of the color or geometry is used to determine the rendering quality of a part of the image.

What is needed is a rendering approach that overcomes the deficiencies of the prior art. More particularly, what is needed is a rendering approach that removes noise and produces a high quality image in short period of time such as a few minutes. The invention satisfies this demand.

SUMMARY OF THE INVENTION

Monte Carlo rendering systems use a set of parameters (typically random numbers) to determine the position and direction of light rays leaving the camera and propagating through the scene. Once a specific ray has been selected by a set of random parameters, the rendering system then performs a physical simulation to calculate where the ray intersects the scene objects. It then computes the world coordinates of the intersection point, as well as extra scene features such as surface normals, texture values, depth, etc. In typical implementations, this information is then used by the rendering system to compute the color for the sample represented by the ray. These samples are then converted into pixel values to form the final image. When a large set of rays are taken, an image that approximates the desired image with complete illumination is computed.

Taking the embodiment of the functional relationship used in filtering methods, the invention is discussed with respect to Monte Carlo rendering. However, it is contemplated that it is applicable to any rendering methods such as Markov Chain Monte Carlo. The invention considerably accelerates Monte Carlo rendering, going from a day per frame to just a few minutes while maintaining high quality of the final image. The algorithm according to the invention is based on a filtering approach referred to herein as "Random Parameter Filtering". For purposes of this application, Random Parameter Filtering refers to the process of determining a relationship between the outputs and the inputs for a rendering system, more specifically, a relationship between the values of the sample computed with the Monte Carlo rendering system and the random parameters used to compute them, and then using this information to reduce the Monte Carlo noise through a filtering process. This allows for the identification of the samples that represent noise in the image, such that a filter can be applied to remove much of the noise while preserving scene features that may look like noise but are desirable, such as dirt marks on a wall. The result is an image that looks like it was rendered with a much higher number of samples, but is produced very quickly. Although the image is not identical to a ground-truth reference image rendered in many hours, visually it is very comparable to the reference images could be acceptable for final production renders.

Random parameter filtering is a simple, post-process technique based on a form of a bilateral filter known as a cross-bilateral filter that works in image space after samples have been computed and that is easy to integrate with a conventional Monte Carlo rendering system. The invention is able to identify Monte Carlo noise and separate it from scene-dependent noise using a simple observation: the undesired Monte Carlo noise occurs whenever the sample values are a function of the random parameters used in the Monte Carlo system. More specifically, noise that is a function of the random parameters is Monte Carlo noise whereas noise that is present in the original scene is scene detail.

For example, in a scene with an area light source that is point sampled by the Monte Carlo system to compute soft shadows, it is seen that in fully dark areas known as the umbra, the final shaded color of the samples is not a function of the random position of the sample on the light source because no matter where the sample is located the shadow ray is always blocked. These regions are not noisy because the random parameters do not affect the output. A similar thing happens in fully lit regions, where the shadow ray is able to reach the light source regardless of its position on the light source. In both of these regions, the scene function is constant with respect to the random point on the light source and so its position does not affect the output of the function. In the penumbra regions, however, some of the shadow rays will reach the light source while others will be blocked by occluders, depending on where the sample is positioned on the light source. This means that the color of the sample in these parts of the image will be a function of the position of the sample on the light source, which is why these regions contain undesired Monte Carlo noise. This same observation holds true for other Monte Carlo noise, otherwise referred to herein as "effects". The term "effects" includes, for example, depth-of-field, motion blur, area light sources, path tracing, Russian roulette, shading, shadows including soft shadows, reflection, transparency, refraction, diffraction, translucency, indirect illumination, to name a few.

Estimating the functional relationships between the inputs and the outputs of the rendering system, the importance of sample features that depend on the random parameters can be reduced when applying a cross-bilateral filter to reduce Monte Carlo noise but preserve scene detail. Unfortunately, finding the functional relationship between sample features and the random parameters in closed, mathematical form is impossible for complex scenes. Furthermore, finding where the scene function is constant with respect to the random parameters is not easy with a small number of samples. Therefore, the rendering system is treated as a "black box" (with scene function) to estimate the functional dependencies, which outputs other scene features in addition to the sample color. The inputs and outputs of the scene function are modeled as random variables, and the functional relationships are estimated by looking for statistical dependencies between them. This is achieved by using the concept of "mutual information"—the measurement of the mutual dependence between random variables—, which conveys how much information inputs provide about a specific output. Although the invention is discussed with respect to mutual information, functional dependency may also be determined in other ways such as co-variance.

According to the invention, for parts of the image where the outputs are functions of the random parameters—i.e., scene function varies with respect to the random parameters for image positions—there exists a connection between the random inputs and the outputs. On the other hand, if the outputs are not functions of the random parameters—i.e., scene function is constant with respect to the random parameters for fixed image positions—, the connection between the output and the random parameter inputs is effectively severed for these regions in the image. This means that in these regions the "signal" from the random inputs never reaches the output, so they do not appear noisy in the final image.

With this analogy in mind, the invention can be thought of as "wiggling" the input parameters with a random number generator and observing the "wiggle" in the output in the form of noise, which only occurs when the output is a function of these noisy inputs. The statistical dependence between the wiggle at the output and that at the inputs is what the mutual information metric uses to estimate the functional dependency between them. However, other ways to determine the functional relationship between the outputs and inputs are contemplated, such as fixing the samples positions in the x, y domain while only changing the random parameters and looking at the variance of the scene function to see if the outputs are affected. Although methods like this might be able to establish a functional dependency, one advantage of the mutual information metric is that it scales up and down as the amount of dependency changes. For example, the sample color in a depth-of-field scene can become a function of the random position on the lens the instant that scene intersection point moves away from the focus plane, resulting in a variance metric that has almost a step-function response. The mutual information metric, on the other hand, scales gradually, so it can be used to size the cross-bilateral filter.

However, mutual information does not always perfectly estimate the functional relationship. It can fail, for example, if the "wiggle" in the output is masked by a complex random function, such as when the output is the function of the input through a look-up table—e.g., a texture—that contains a set of random numbers as elements. This makes the input and output appear to be statistically independent and therefore hides their connection from the mutual information metric. However, compared to the other metrics, mutual information works well for a variety of complex scenes. It should be noted that although the presence of Monte Carlo noise requires that the scene function vary with respect to the random parameters in parts of the image (i.e., there should be a connection between the random inputs and the outputs in these regions), the noise seen in the final image can be attributed to the random parameters themselves, not to the variance in the integrand of the scene function. This can clearly been seen if the input parameters are replaced with uniformly sampled values. Although the scene function is unchanged, the noise has been replaced by banding artifacts in which the differences between sample values that are used by the bilateral filter have different properties than when generated with random numbers. Of course, only regions where the sample value is a function of the random parameters are affected by this change in input, while the other regions remain the same. The invention uses mutual information to detect the presence of noise from the inputs in the functional outputs, thereby filtering out the noise generated by the random parameters in Monte Carlo rendering.

It is also contemplated that mutual information may be used between the outputs and the inputs of a rendering system to determine what regions have moved or what regions have noise in them such that more samples can be thrown into that region. It is also contemplated that mutual information may be used between the outputs and the inputs of a rendering system to estimate the amount of noise in any region such that a denoising algorithm can be applied based on the noise level in order to remove the Monte Carlo noise.

Using a filter similar to the bilateral filter referred to herein as a cross-bilateral filter, the noise can be removed by adjusting the variance of the filter based on the statistical dependencies of scene features on the random parameters. Specifically, a bilateral filter is one that takes into account both the sample position and the sample value when applying the filter, unlike a standard Gaussian filter that only takes into account the sample position. This enables the bilateral filter to preserve edges in the image. For example, a bilateral filter using the scene features (as a feature vector) in order to reduce noise while preserving scene details may preserve a texture on a surface, wherein the texture value may be included in the bilateral filter to prevent blurring across that detail.

One advantage of the invention is that it is general and can handle any of the effects that can be computed using Monte Carlo integration. Physical meaning does not need to be attributed to the random parameters. Instead, the invention embodies the spirit of traditional Monte Carlo integration, where only the random values need to be provided for each parameter that the system should integrate over.

The random parameters must be specified that are to be filtered so that the algorithm can remove the noise from each of the effects in the final image. The invention allows for a wide range of Monte Carlo effects to be handled including effects that require discrete integration (summation) such as integrating over multiple light sources using a discrete random number to select between them, or using Russian roulette to randomly either transmit or reflect a ray off a semi-transparent surface.

The invention may be used in a variety of applications. For example, any application that uses Monte Carlo integration to compute results may benefit from the invention. For example, the invention may be used with simulation of particle transport. As another example, the invention may be used in finance applications such as with the calculation of options. The invention may also be implemented with an image capturing device to produce a "clean image" or be used to produce a "dirty image" to protect access to the "clean image". Furthermore, the invention may be used to regulate or control distribution and access to content.

In one embodiment of the invention, the functional relationship is used in filtering methods to reduce the noise directly as a post-process. In another embodiment of the invention, the functional relationship is used in adaptive sampling methods to position new samples efficiently. In yet another contemplated embodiment of the invention, the functional relationship is used in a combination of filtering methods and adaptive sampling methods.

Turning to the embodiment of the functional relationship used in adaptive sampling, the basic idea is that the traditional Monte Carlo image rendered with a few number of samples is noisy exactly where the features are a function of (or depend on) the random parameters. After all, this is the source of the Monte Carlo noise. Although this information can be used to know where to filter, this information can also be used to know where to throw new samples in the adaptive sampling case. For example, a low resolution version of the image, say 10×10 smaller than the final image, can be rendered. A sufficient number of samples are taken at each macro pixel, for example 64 samples, so that the statistical dependencies can be established thereby communicating which areas of the image are dependent on the random parameters and which ones are not. Less than 1 sample per pixel is found by taking every group of 10×10 pixels and throwing only 64 samples in that group.

Therefore, to render an image with 8 samples/pixel on average, a lot of samples are left over that can be thrown in. More samples are added where scene features are dependent on the random parameters. It is contemplated that a sufficient number of samples could produce noise-free images without the need to do any filtering.

In yet another embodiment of the invention, the adaptive sampling method can be incorporated with a filtering method or random parameter filtering method. It is observed that the random parameter filter is actually quite good at removing noise in the regions that depend on the random parameters and should be blurred. Therefore, the additional samples would be thrown in the place that does not depend on the random parameters since a smooth result can be achieved by using a filter. This is in stark contrast to the traditional adaptive method which place more samples in the regions that are noisy to make them less noisy. According to the invention, the filter removes the noise very nicely and because these regions should not have a lot of detail anyway the samples can be saved for the regions with more detail.

Although the invention renders the samples only once and then removes the noise of the final image, it is contemplated to incorporate the invention in the middle of an adaptive loop that takes some samples, performs filtering, and then takes additional samples. For example, the invention may use the statistical dependency to detect noisy regions and place more samples in those regions.

The invention and its attributes and advantages will be further understood and appreciated with reference to the detailed description below of presently contemplated embodiments, taken in conjunction with the accompanying drawings.

BRIEF DESCRIPTION OF THE DRAWINGS

FIG. 2 illustrates a table of notations according to one embodiment of the invention;

FIG. 5 illustrates an algorithm related to computing feature weights according to one embodiment of the invention;

DETAILED DESCRIPTION OF THE INVENTION

The invention is computer rendering system method for increasing the quality of an image from a scene file. The scene file typically contains information about the objects in the scene such as geometric shape, material properties, etc. The scene file may also include light sources such as shape, size, position, color, intensity, etc. and information about the camera including position, orientation, resolution, etc. The scene file may also include texture maps and shaders that specify how the individual surfaces should be colored. A set of samples are computed from the scene file and intermediate information is saved. The intermediate information includes scene independent data and scene dependent data. Scene independent data is computed by the rendering system and may include, for example, screen position and random parameters, such as the position on the lens (for computing depth-of-field) or the time of the sample (for computing motion blur). Scene dependent data is derived from the scene file using the given scene independent data and includes, for example, scene features and sample color. Scene features include world position, texture coordinates, texture values, normal, and depths to name a few. A relationship between the scene dependent data and the scene independent data is calculated. The relationship may be based on mutual information, statistical dependency, or some other metric. The relationship assists in differentiating artifacts (or noise) of the scene file and the rendering system (Monte Carlo random parameters). The relationship is used with a process to output the image. Processes include filtering methods and adaptive sampling methods.

Figure 1:
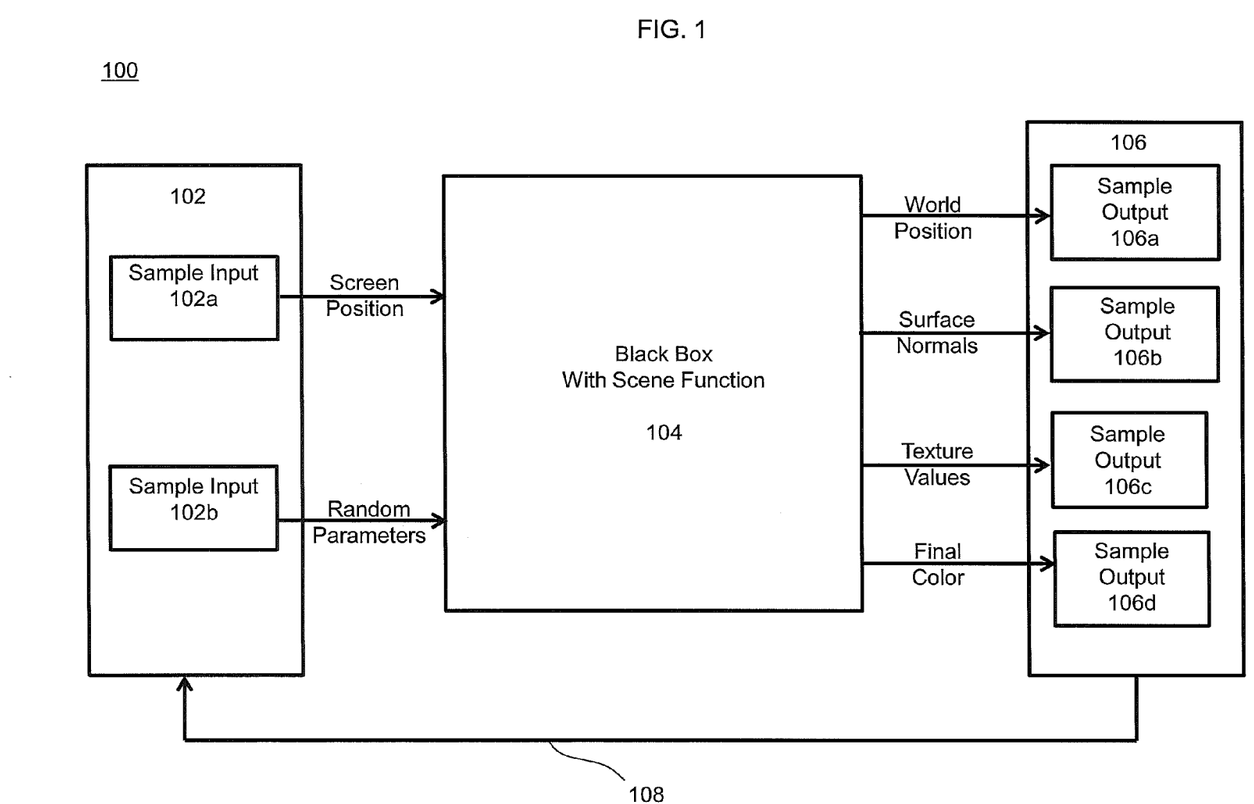
FIG. 1 illustrates a rendering system treated as a black box according to one embodiment of the invention.

FIG. 1 illustrates a rendering system treated as a black box according to one embodiment of the invention. According to the invention, determining where Monte Carlo noise occurs in an image begins with identifying the regions in which the sample values are functions of the random parameters. To do this, the rendering system 100 is treated as a black box 104 with scene function $f(\ )$ that is evaluated deterministically by the ray tracing system for a specific scene, for example, a scene with depth-of-field. This function takes as its only inputs 102 the screen position x, y 102a on the image as well as the random parameters u, v 102b for Monte Carlo integration—i.e., the position on the lens. Since these are the only inputs 102 to the deterministic system, the outputs 106 of the black box 104 must all be functions of these inputs (or constant with respect to them). These outputs 106 are a set of features for each sample, such as world position 106a, surface normal 106b, texture value 106c or the output of the texture lookup, and sample color 106d or the final shaded value. The invention estimates the functional relationship by taking a set of samples in a neighborhood $\mathcal{N}$ and treating the input values 102 and output values 106 of this neighborhood as statistical random variables. The statistical dependence of the outputs 106 are then determined based on the inputs 102 using mutual information as shown by 108. This allows a determination as to which scene features are highly dependent on random parameters so that their weight can be adjusted such as lowered during bilateral filtering.

Taking a scene with depth-of-field, the input parameters are changed while keeping the scene function $f(\ )$ the same. Setting the random parameters u, v to random values for each sample produces a noisy image. However, if uniform parameters for the random parameters u, v are used, the noise is replaced with banding artifacts. It should be noted that only the regions where the sample color is a function of the random parameters are affected by changing the parameters u, v so the regions that are in focus in a depth-of-field scene are mostly unchanged. Thus, the Monte Carlo noise to be eliminated is directly caused by the random parameters whenever the sample values are a function of them.

FIG. 2 illustrates a table of notations used in describing the invention. The invention can be described in four parts: (1) the overall method according to an algorithm of one embodiment of the invention, (2) the pre-processing of the samples by clustering them and removing their mean and standard deviation; (3) the statistical computation of the feature weights for the cross-bilateral filter using the statistical dependency of features on the random variables, and (4) filtering the samples.

Figure 3:
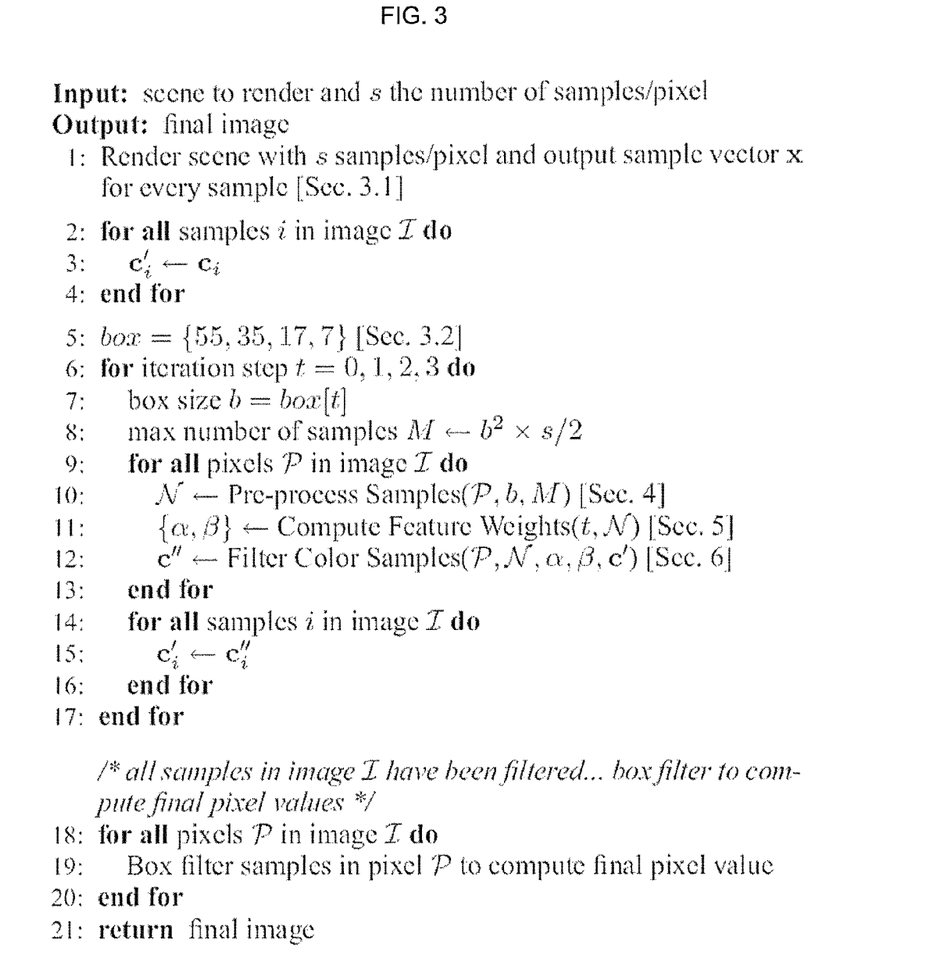
FIG. 3 illustrates an algorithm related to random parameter filtering according to one embodiment of the invention.

FIG. 3 illustrates the overall method according to an algorithm related to random parameter filtering according to one embodiment of the invention. Samples are rendered and feature vectors are created. The invention can be considered a post-process filter, so the first step is to render the samples at the given sampling rate of s samples/pixel and then the filtering process is applied, which consecutively performs the filter in several iterations. First, samples are rendered at a fixed sampling density and a vector x is stored for each sample. The data structure is simply a floating point array with enough space for the number of samples (computed as the image resolution times the number of samples/pixel s) and enough space for each such as 27 floats per sample to store all the information. For the scene features in f, the invention stores for each sample the normal, world-space position, and texture values (the set of floats from texture lookups used by the surface shader to produce the surface color) for the first intersection point of the ray, and the world position and normal for the second intersection in a path tracer. The same features are stored for every scene. If an object does not have the specific feature, a zero is substituted or if the shader does not use the feature when computing the final color, features that do not affect the final color are ignored. Since all these features are available to the rendering system at some point during the tracing of the ray, outputting the feature vector for the sample is simply a matter of caching the information after it is calculated, which is standard practice in rendering systems when creating a G-buffer for deferred shading.

In addition to these scene-dependent features, the invention stores the random parameters used by the Monte Carlo system so that it can identify the functional relationships between the inputs and the outputs. Wherever possible, these random parameters are used in the form that most closely reflects their use in the renderer. For example, the random u, v position on the lens for depth-of-field can be computed in several ways: two uniformly distributed random numbers can be used from 0 to 1 that are then scaled and translated into a −1 to 1 range on a square lens, or the random numbers can be used to pick θ and r values that uniformly sample a circular lens without rejection, etc. Rather than deal with the raw random parameters that have no physical meaning, the final random values are used as they are used by the rendering system. In the case of the position on the lens, the final u, v values ranging from −1 to 1 are used as the random parameters because these relate to the physical process simulated by the rendering system. In most cases the random parameters are floating point values, but they could also be integers, such as when a discrete random number is used to select an individual light source for lighting with multiple light sources.

Note that in industrial rendering systems these random parameters are often determined with pre-computed sequences of low discrepancy numbers provided to the renderer. In this case, the random parameters do not need to be stored in the sample vector since the post-process filter could use this same sequence to recompute the random parameters on the fly. According to one embodiment, however, a brute-force approach may be used with the PBRT2 and LuxRender Monte Carlo rendering systems to compute the samples. Furthermore, Monte Carlo-based approaches such as photon mapping and bi-directional path tracing may be implemented in accordance with the invention.

As shown by FIG. 3, To estimate the functional dependencies of sample values on the inputs to the Monte Carlo rendering system using mutual information, a set of samples to process are selected. Every sample in the image cannot be used because the functional dependencies change from region to region. For example, an image may have some regions in focus and others out of focus, and these have different dependencies on the random parameters. Therefore, as every pixel is looped over in the image, a local neighborhood of samples $\mathcal{N}$ is selected around that pixel to measure the local statistics for mutual information. However, how big to make the block size needs to be decided in order to define the extent of neighborhood $\mathcal{N}$. If a large block size is used, there will be more samples to calculate statistics thereby improving the accuracy of the dependency estimates and providing more samples to filter out noise. Unfortunately, larger block sizes have fewer localities and might cause problems when the block overlaps regions with different functional dependencies, such as regions where the amount of defocus blur changes. To resolve these two competing considerations, a multi-pass approach is used where the invention loops over the image several times using different block sizes.

Starting at a larger block size and shrinking the block size down in a series of iterations, four iterations are found to be sufficient, for example, starting at a block size of 55 pixels wide and going down to 35, 17 and finally 7 pixels wide. At each step, the samples' colors are filtered with the weighted bilateral filter using the samples in $\mathcal{N}$, and the new filtered color in the next pass of the algorithm is used—except to compute statistical dependencies, since they are always computed with the original sample color. By going from larger to smaller block size, the low frequency noise is addressed that a smaller filter kernel would leave behind and then, as the block size is reduced, the localized noise is eliminated and the detail cleaned up. The multi-pass approach also reduces the maximum block size needed for filtering, since a larger filter can be emulated by progressively applying a smaller kernel. This allows the achievement of good performance and quality at the same time.

After the samples are rendered, the random parameter filtering algorithm is ready to be applied, which is performed independently for every pixel of the image. As each pixel is looped over, the samples are pre-processed in the block around the pixel to create a neighborhood $\mathcal{N}$ of samples to use to compute statistics and perform filtering as shown by FIG. 4.

Figure 4:
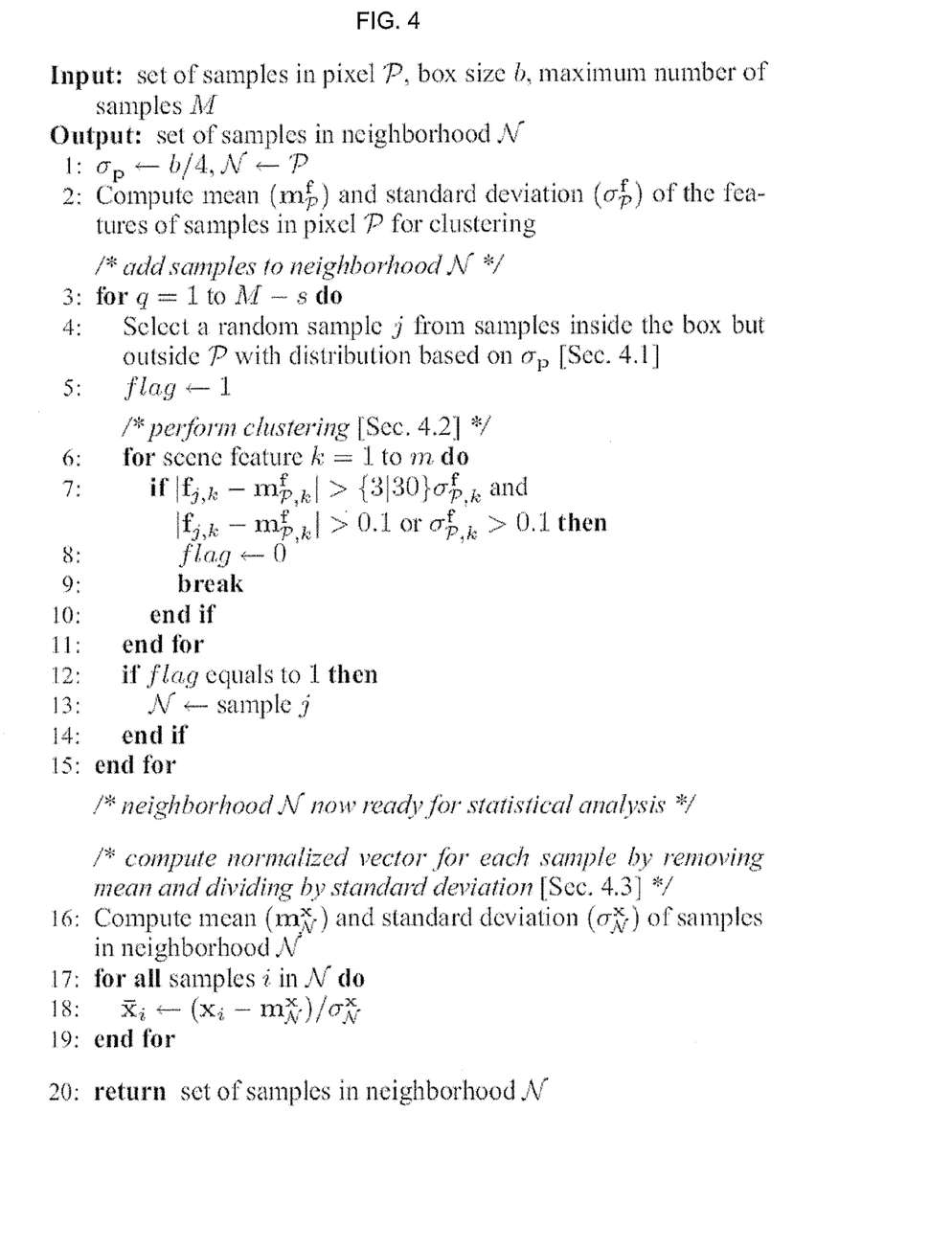
FIG. 4 illustrates an algorithm related to pre-processing samples according to one embodiment of the invention.

As shown in FIG. 4, the bilateral filter is applied to the samples in the block of pixels. However, for large block sizes, the process of calculating the contribution of all samples to any given sample is time consuming because the number of samples increases as $O(N^2)$ with block size. To accelerate this process, a random subset of samples within the block is selected and only these samples are used for statistical analysis and to filter the samples within the pixel. This is a form of Monte Carlo estimation and significantly accelerates the calculations. Although it may introduce a slight error, the error is small and found to be reasonable considering the improvement in running time for the algorithm. The bilateral filter according to the invention weights samples based on screen position, distance with a Gaussian of variance $\sigma_p^2$ that depends on the block size ($\sigma_p = b/4$). Since a set of random samples are selected, they can be drawn with a Gaussian distribution with variance $\sigma_p^2$ around the pixel in question in order to essentially perform importance sampling. This allows the first term to be removed from the bilateral filter calculation as discussed more fully below.

Some kind of clustering needs to be performed when placing samples in neighborhood $\mathcal{N}$ to avoid mixing statistics. The set of samples $\mathcal{P}$ at the current pixel $\mathcal{N} \Leftarrow \mathcal{P}$ are always included in neighborhood $\mathcal{N}$. Then, a random set of samples is selected with a Gaussian distribution from the block of pixels as described above and added to the neighborhood $\mathcal{N}$ only if all of their scene features f are within three standard deviations of the mean for the pixel. So given sample j, that is within the block of pixels:

$$\mathcal{N} \Leftarrow \mathcal{N} \cup j \text{ if } |f_{j,k} - \mathrm{m}^{\mathbf{f}}_{\mathcal{P},k}| < 3\, \sigma^{\mathbf{f}}_{\mathcal{P},k} \text{ for all } k.$$

In one embodiment, a value of 30 instead of 3 is used when testing the world position since it varies much more than the other features. Also, this test is only done when $\sigma^{\mathbf{f}}_{\mathcal{P},k} > 0.1$ because it is not desirable to throw all the samples away in cases where the variance is very small, such as constant-valued regions.

Before the statistical dependencies for a set of samples in a neighborhood is computed, the scene features are normalized by removing the mean and dividing by the standard deviation for each of the elements in the sample vector. The reason for this is that the features in f reside in very different coordinate systems. For example, world positions could be in the range of 0 to 1000, while the normal vector could have components in the range of 0 to 1. If this discrepancy is not corrected, a larger weight could inadvertently be given to certain features when calculating dependency that may not necessarily be more important. Vectors that have been normalized in this manner are represented with a bar, for example, f becomes $\bar{f}$.

The core of the algorithm according to the invention is the computation of the color weights α and feature weights β as shown in FIG. 5. Mutual information is used to compute the statistical dependencies between a sample feature and the inputs to the Monte Carlo system.

Since it is difficult to derive an exact functional relationship between scene features and the inputs of the rendering system $p_i$ and $r_i$ for complex scenes, a statistical dependency is proposed based on the inputs providing information about the scene features. The invention uses mutual information, which is the exact measure of dependence between two random variables and indicates how much information one tells about another. In one embodiment, the mutual information between two random variables X and Y can be calculated as:

$$\mu(X; Y) = \sum_{x \in X} \sum_{y \in Y} p(x, y) \log \frac{p(x, y)}{p(x)p(y)},$$

where these probabilities are computed over the neighborhood of samples $\mathcal{N}$ around a given pixel. To calculate the mutual information between two vectors x and y, specifically, $\bar{f}_{\mathcal{N},k}$ and $\bar{r}_{\mathcal{N},l}$ respectively, the histogram for each is calculated. To compute the histograms, all values are made positive by subtracting the minimum element in the vector and quantizing the elements into integer bins by rounding their values. How many times the values of x fall inside each bin are counted and the probabilities are found by dividing by the length of x. A joint histogram is calculated in a similar way, except with pairs of values (x, y).

To estimate statistical dependencies on inputs, the dependency of the $k^{th}$ scene feature on all random parameters (given by $D_{f,k}^r$) is calculated using mutual information. The heuristic approximates this by measuring the dependency on individual random parameters and adding them up. Therefore, the statistical dependency is first calculated between the $k^{th}$ scene feature and the $l^{th}$ random parameter by $D_{f,k}^{r,l} = \mu(\bar{f}_{\mathcal{N},k}; \bar{r}_{\mathcal{N},l})$, and then the dependency of the $k^{th}$ scene feature on all n random parameters is approximated as:

$$D_{f,k}^r = \sum_{1 \le l \le n} D_{f,k}^{r,l} = \sum_{1 \le l \le n} \mu(\bar{f}_{\mathcal{N},k}; \bar{r}_{\mathcal{N},l})$$

The dependency of the $k^{th}$ scene feature on screen position ($D_{f,k}^p$) and color dependencies $D_{c,k}^r$ and $D_{c,k}^p$ are similarly computed:

$$D_{f,k}^p = \sum_{1 \le l \le 2} D_{f,k}^{p,l} = \sum_{1 \le l \le 2} \mu(\bar{f}_{\mathcal{N},k}; \bar{p}_{\mathcal{N},l}),$$

$$D_{c,k}^r = \sum_{1 \le l \le n} D_{c,k}^{r,l} = \sum_{1 \le l \le n} \mu(\bar{c}_{\mathcal{N},k}; \bar{r}_{\mathcal{N},l}),$$

$$D_{c,k}^p = \sum_{1 \le l \le 2} D_{c,k}^{p,l} = \sum_{1 \le l \le 2} \mu(\bar{c}_{\mathcal{N},k}; \bar{p}_{\mathcal{N},l}).$$

The dependency of the $k^{th}$ color channel on all the scene features is computed so that later the weight for features that do not contribute to the final color can be reduced:

$$D_{c,k}^f = \sum_{1 \le l \le m} D_{c,k}^{f,l} = \sum_{1 \le l \le 2} \mu(\bar{c}_{\mathcal{N},k}; \bar{f}_{\mathcal{N},l}).$$

In addition, a related term is computed pertaining to how all color channels are dependent on the $k^{th}$ scene features:

$$D_c^{f,k} = \sum_{1 \le l \le 3} D_{c,l}^{f,k} = \sum_{1 \le l \le 3} \mu(\bar{c}_{\mathcal{N},l}; \bar{f}_{\mathcal{N},k}).$$

Finally, the terms $D_{c,k}^r$, $D_{c,k}^p$, $D_c^f$ are calculated by summing over the color channels:

$$D_c^r = \sum_{1 \le k \le 3} D_{c,k}^r, D_c^p = \sum_{1 \le k \le 3} D_{c,k}^p, D_c^f = \sum_{1 \le k \le 3} D_{c,k}^f.$$

As shown in FIG. 5, the error of the approximation is determined. Ideally, the statistical dependency of the $k^{th}$ scene feature on all random parameters is calculated using the joint mutual information $\mu(r_{\mathcal{N},1}, r_{\mathcal{N}}, \ldots, r_{\mathcal{N},n}; f_{\mathcal{N},k})$. Unfortunately, this joint mutual information can be difficult and expensive to compute as the number n gets larger, because the histogram grows to the power of n while the number of samples to do statistics grows linearly. This means that the ability to compute the histogram accurately degenerates quickly and it becomes much slower to do so. For this reason, the approximation is performed by measuring the dependency on individual random parameters and adding them up as described above.

Now the effect this has in the overall calculation of statistical dependency is examined. To keep things simple, it is assumed that two statistically independent random variables $R_1$ and $R_2$ are inputs to the system and produce the output feature Y. In order to measure $\mu(R_1, R_2; Y)$, it is approximated as $\mu(R_1; Y) + \mu(R_2; Y)$. The following derivative shows that the statistical dependence is underestimated:

$$\mu(R_1, R_2; Y) = H(R_1, R_2) - H(R_1, R_2 | Y)$$
$$= H(R_1) + H(R_2 | R_1) - H(R_1 | Y) - H(R_2 | R_1, Y)$$
$$= \mu(R_1; Y) + H(R_2 | R_1) - H(R_2 | R_1, Y)$$

If $R_1$ are $R_2$ are independent, then $H(R_2|R_1)=H(R_2)$ such that:

$$\mu(R_1, R_2; Y) = \mu(R_1; Y) + H(R_2) - H(R_2 | R_1, Y)$$
$$= \mu(R_1; Y) + \mu(R_2; R_1, Y)$$
$$= \mu(R_1; Y) + \mu(Y, R_1; R_2)$$
$$= \mu(R_1; Y) + \mu(R_2; Y) + \mu(R_1; R_2 | Y)$$

Thus, the approximation that $\mu(R_1, R_2; Y) \approx \mu(R_1; Y) + \mu(R_2; Y)$ effectively assumes that $\mu(R_1; R_2|Y)=0$. This means that the information is ignored that the output feature tells about relationship between the inputs, which might not be zero even though the inputs are statistically independent. To understand why, the function $f( )$ is set to act as an XOR gate of two inputs. If one of the inputs and the output is known, the other input can automatically be determined even though the two inputs may be statistically independent. Since $\mu(R_1; R_2|Y) \ge 0$, the approximation is an underestimate of the true joint mutual information between the random parameters and the scene feature. However, the approximation works quite reasonably, even for intricate scenes with complex relationships between the random parameters and the scene features.

Since the sample features are only functions of the random parameters $r_i$ and the screen position $p_i$, the heuristic computes the fractional contribution of the random parameters to the $k^{th}$ scene feature with the following formula:

$$W_{f,k}^r = \frac{D_{f,k}^r}{D_{f,k}^r + D_{f,k}^p + \varepsilon}$$

The addition of the term $\varepsilon$ term prevents degeneration when the dependencies $D_{f,k}^r$ and $D_{f,k}^p$ are both small. This expression communicates how much the $k^{th}$ feature was affected by the random parameters as a fraction of the contributions from both sets of inputs, with the reasonable assumption that the position and random parameters are statistically independent. When the sample is only a function of the random parameters, this value will be close to 1, and when it is dependent only on the screen position it will be 0. In the common case where there is some contribution from both inputs, for example, a partially out-of-focus object is dependent on both screen position and u, v, the invention simply interpolates between the two.

The invention also includes a similar algorithm using the dependencies of the $k^{th}$ sample color channel on the random parameters $D_{c,k}^r$ and on the screen position $D_{c,k}^p$ to compute the fractional contribution of the random parameters on the $k^{th}$ color channel:

$$W_{c,k}^r = \frac{D_{c,k}^r}{D_{c,k}^r + D_{c,k}^p + \varepsilon}$$

The overall contribution of the random parameters on the color $W_c^r$ for use in sizing the filter is obtained by averaging the $W_{c,1}^r$, $W_{c,2}^r$, $W_{c,3}^r$ terms:

$$W_c^r = \frac{1}{3}(W_{c,1}^r + W_{c,2}^r + W_{c,3}^r).$$

Lastly, the $W_c^{f,k}$ term is computed to communicate how much the color depends on a specific feature:

$$W_c^{f,k} = \frac{D_c^{f,k}}{D_c^r + D_c^p + D_c^f}$$

As shown in FIG. 5, the computation of the fractional contributions is determined. Specifically, once the statistical dependencies have been calculated, the normalized dependencies are computed to determine the $\alpha$ and $\beta$ parameters. The $\alpha$ and $\beta$ parameters are adjusted in each iteration as the block size decreases by giving more weight to the dependency on the random parameters. The idea behind this is that when the block sizes are large, there will be an increase in dependency on the spatial screen position because of the natural spatial variations in the image. However, the statistics are more corrupt because of the mixing of statistics that happens with large block sizes. Therefore, more weight is given to the normalized dependency on the random parameters as the block size goes down with each iteration. This adjustment is expressed as:

$$\alpha_k = \max(1 - 2(1+0.1t)W_{c,k}^r, 0)$$

$$\beta_k = W_c^{f,k} \cdot \max(1-(1+0.1t)W_{f,k}^r, 0)$$

where the t term is the iteration of the multi-pass approach, with the first pass t=0. The incorporation of the t term increases the weight of $W_{c,k}^r$ and $W_{f,k}^r$ upon each successive iteration, and the max( ) term is added to ensure that the value stays positive.

Figure 6:
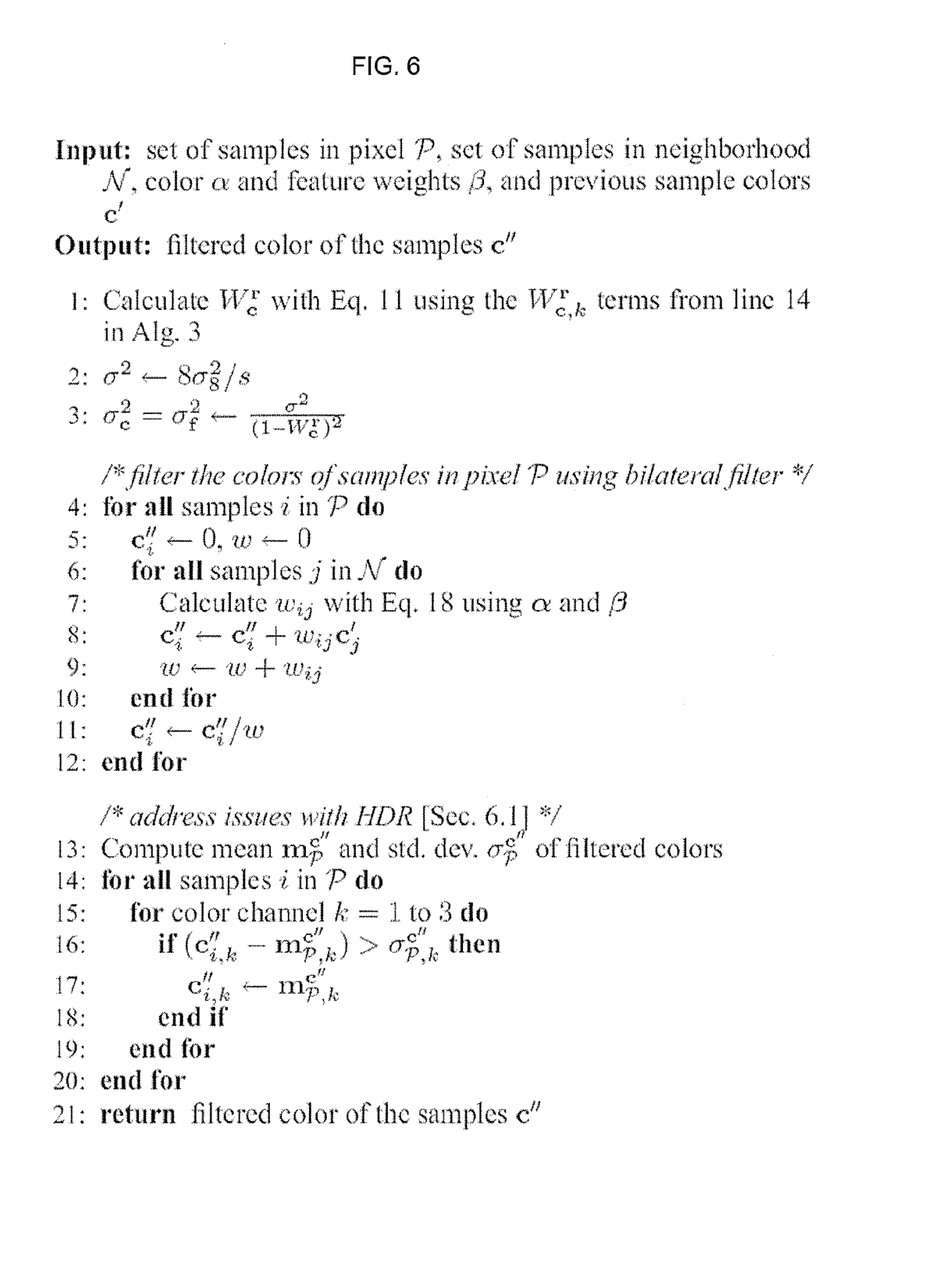
FIG. 6 illustrates an algorithm related to filtering the samples according to one embodiment of the invention.

As shown in FIG. 6, the color samples are filtered. The invention filters the color of samples $x_i$ using a weighted bilateral filter in which the importance of the color and scene features is adjusted to reflect their dependence on the random parameters:

$$w_{ij} = \exp\left[-\frac{1}{2\sigma_p^2} \sum_{1 \le k \le 2} (\bar{p}_{i,k} - \bar{p}_{j,k})^2\right] \times$$

$$\exp\left[-\frac{1}{2\sigma_c^2} \sum_{1 \le k \le 3} \alpha_k (\bar{c}_{i,k} - \bar{c}_{j,k})^2\right] \times$$

$$\exp\left[-\frac{1}{2\sigma_f^2} \sum_{1 \le k \le m} \beta_k (\bar{f}_{i,k} - \bar{f}_{j,k})^2\right],$$

where $w_{i,j}$ is the contribution—or weight—of the $j^{th}$ sample to the $i^{th}$ sample during filtering. Because of the way the samples are selected in neighborhood $\mathcal{N}$ randomly using a Gaussian distribution with standard deviation $\sigma_p$ (where $\sigma_p = b/4$), the first term of this expression is dropped and becomes:

$$w_{ij} = \exp\left[-\frac{1}{2\sigma_c^2} \sum_{1 \le k \le 3} \alpha_k (\bar{c}_{i,k} - \bar{c}_{j,k})^2\right] \times$$

$$\exp\left[-\frac{1}{2\sigma_f^2} \sum_{1 \le k \le m} \beta_k (\bar{f}_{i,k} - \bar{f}_{j,k})^2\right].$$

The variances of the Gaussians for both the color and the feature are set to the same value:

$$\sigma_c^2 = \sigma_f^2 = \frac{\sigma^2}{(1 - W_c^r)^2}$$

The variances are divided by $(1-W_c^r)^2$ because, in the end, only the sample color is of importance and a large filter is desired wherever the color depends a lot on the random parameters, i.e., is very noisy. This term adjusts the size of the Gaussian based on the overall noise level, making it large when needed. The terms $\sigma_c^2$ and $\sigma_f^2$ are separated since they depend on all three color channels (because of the $W_c^r$ term) as opposed to $\alpha_k$ (whose $W_{c,k}^r$ term varies per color channel). Therefore, the terms $\sigma_c^2$ and $\sigma_f^2$ modulate the overall size of the Gaussian while $\alpha_k$ and $\beta_k$ adjust it further based on dependencies with the random parameters. The Because the constant $\sigma_s^2$ is divided by the number of samples when computing the filter's variance $\sigma^2$, the invention is a biased but consistent estimator, meaning that the estimator converges to the value of the integral as the number of samples per pixel s goes to infinity. As s→∞, a weight of $w_{i,j}=1$ is produced only when i=j and zero is everywhere else.

Therefore, the colors of the samples are not filtered at all, so the invention converges to standard Monte Carlo, which is a consistent estimator.

Once the filter weights $w_{i,j}$ are obtained, these weights are used to blend in the color contributions from these samples:

$$c''_{i,k} = \frac{\sum_{j \in \mathcal{N}} w_{ij} c'_{j,k}}{\sum_{j \in \mathcal{N}} w_{ij}}$$

where the denominator is never zero because at least $w_{i,i}=1$ (a sample fully contributes to itself). Note that this process filters the colors of individual samples (not pixels), and is performed separately for every pixel in the image, since statistics change from pixel to pixel. After all samples in the image have been filtered, the process is repeated with a new iteration as shown in FIG. 3.

The invention can be applied to a variety of scenarios such as using only direct lighting to highlight the illumination contribution from path tracing. Many regions of the image may be completely dark when using only direct lighting because these regions are totally occluded from the sky light source. This means that the illumination in these regions that is visible is due exclusively to path-tracing. The invention is able to denoise these regions by examining the relationship between the sample values and the random parameters used to compute the bounces of each path.

Path-tracing is notoriously noisy, and when Monte Carlo samples are input to the algorithm, much of the detail in the textures in the scene is completely gone. This is more evident if the color channel is multiplied by 1000. Many of the pixels remain black, which indicates that these pixels have no useful color information. The cross-bilateral filter examines other sample features, such as world position, surface normal, and texture value, each weighted depending on their amount of functional dependency on the random parameters. In embodiments where the samples' colors are extremely noisy because the path tracing produces a lot of noise while computing the global illumination, the invention detects the connection between the sample color and the random parameters of the path tracer, and essentially ignores the color when bilateral filtering. The texture value, on the other hand, is found to have little dependence on the random parameters so it is weighted heavily by the cross-bilateral filter.

Therefore, to filter a sample its color is ignored while close attention is paid to its texture value. When blending in values from around the filter kernel, only samples with similar texture values are blended together. Therefore, if a sample hits a dark part of the texture, samples from other parts of the texture are blended in that are also dark. Essentially, the filter according to the invention combines many noisy samples of dark texture together to approximate a noise-free dark texture. Of course, some blurring of the texture detail occurs when a large filter kernel is used to help denoise a very noisy image. Ideally, a small filter is desired to help preserve detail. The invention is reasonably robust and of great importance in production environments.

Although color is treated as a special feature since the color channel is filtered, it is contemplated that only incident illumination may be filtered and used in a surface shader to get an improved result.

Figure 7:
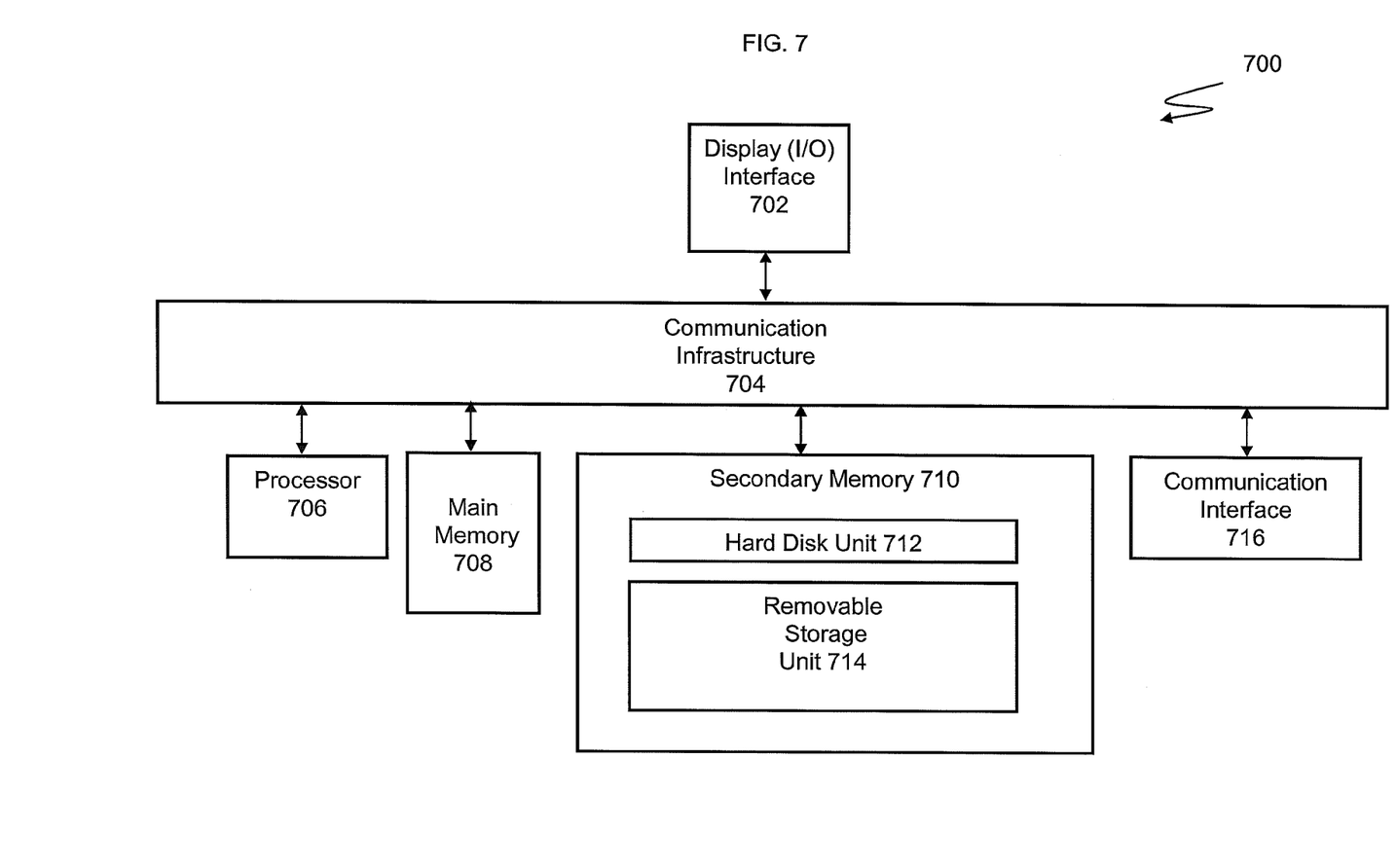
FIG. 7 illustrates an exemplary computer rendering system that may be used to implement the methods according to the invention.

FIG. 7 illustrates an exemplary computer rendering system 700 that may be used to implement the methods according to the invention. One or more computer systems 700 may carry out the methods presented herein as computer code.

Computer system 700 includes an input/output display interface 702 connected to communication infrastructure 704—such as a bus—, which forwards data such as graphics, text, and information, from the communication infrastructure 704 or from a frame buffer (not shown) to other components of the computer system 700. The input/output display interface 702 may be, for example, a keyboard, touch screen, joystick, trackball, mouse, monitor, speaker, printer, any other computer peripheral device, or any combination thereof, capable of entering and/or viewing data.

Computer system 700 includes one or more processors 706, which may be a special purpose or a general-purpose digital signal processor that processes certain information. Computer system 700 also includes a main memory 708, for example random access memory, read-only memory, mass storage device, or any combination thereof. Computer system 700 may also include a secondary memory 710 such as a hard disk unit 712, a removable storage unit 714, or any combination thereof. Computer system 700 may also include a communication interface 716, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 708, secondary memory 710, communication interface 716, or a combination thereof, function as a computer usable storage medium, otherwise referred to as a computer readable storage medium, to store and/or access computer software including computer instructions. For example, computer programs or other instructions may be loaded into the computer system 700 such as through a removable storage device, for example, a floppy disk, ZIP disks, magnetic tape, portable flash drive, optical disk such as a CD or DVD or Blu-ray, Micro-Electro-Mechanical Systems, nanotechnological apparatus. Specifically, computer software including computer instructions may be transferred from the removable storage unit 714 or hard disc unit 712 to the secondary memory 710 or through the communication infrastructure 704 to the main memory 708 of the computer system 700.

Communication interface 716 allows software, instructions and data to be transferred between the computer system 700 and external devices or external networks. Software, instructions, and/or data transferred by the communication interface 716 are typically in the form of signals that may be electronic, electromagnetic, optical or other signals capable of being sent and received by the communication interface 716. Signals may be sent and received using wire or cable, fiber optics, a phone line, a cellular phone link, a Radio Frequency link, wireless link, or other communication channels.

Computer programs, when executed, enable the computer system 700, particularly the processor 706, to implement the methods of the invention according to computer software including instructions.

The computer system 700 described herein may perform any one of, or any combination of, the steps of any of the methods presented herein. It is also contemplated that the methods according to the invention may be performed automatically, or may be invoked by some form of manual intervention.

The computer system 700 of FIG. 7 is provided only for purposes of illustration, such that the invention is not limited to this specific embodiment. It is appreciated that a person skilled in the relevant art knows how to program and implement the invention using any computer system.

The computer system 700 may be a handheld device and include any small-sized computer device including, for example, a personal digital assistant, smart hand-held computing device, cellular telephone, or a laptop or netbook computer, hand held console or MP3 player, tablet, or similar hand held computer device, such as an iPad®, iPad Touch® or iPhone®.

While the invention has been described with reference to particular embodiments, those skilled in the art will recognize that many changes may be made thereto without departing from the scope of the invention. Each of these embodiments and variants thereof is contemplated as falling with the scope of the claimed invention, as set forth in the following claims.

What is claimed is:

1. A method for performing a random parameter filter, comprising the steps of:
   rendering one or more image samples at a given sampling rate;
   storing a vector of a plurality of scene features for each image sample;
   saving one or more random parameters for each image sample used to calculate the image sample by a rendering system;
   choosing the one or more image samples to process;
   performing pre-processing on the one or more image samples;
   calculating a dependency of a color and a feature of the one or more random parameters and one or more rendering system inputs to obtain a calculated dependency;
   using the calculated dependency to determine a weight for each scene feature to obtain dependency information;
   modifying the one or more image samples using the dependency information to obtain a final modified sample;
   filtering the final modified sample to produce one or more pixels; and
   outputting a final image.

2. The method for performing a random parameter filter according to claim 1, wherein the choosing step further comprises the step of conducting iterations of block around a pixel of the image sample from a large size to a small size.

3. The method for performing a random parameter filter according to claim 1, wherein the choosing step further comprises the step of selecting a random subset of image samples within each block.

4. The method for performing a random parameter filter according to claim 1, wherein the performing step further comprises the step of clustering image samples into one or more groups.

5. The method for performing a random parameter filter according to claim 4, wherein, wherein the clustering step includes the step of calculating the standard deviation of the mean for one or more pixels of the image sample.

6. The method for performing a random parameter filter according to claim 1, wherein the performing step further comprises the step of manipulating the vector by removing the mean and dividing by the standard deviation for each scene feature of the plurality of scene features for each image sample.

7. The method for performing a random parameter filter according to claim 1, wherein the dependency is a statistical dependency.

8. The method for performing random parameter filter according to claim 1, wherein the one or more scene features is at least one selected from the group comprising of: world position, surface normal, color, texture value, texture coordinate, and shader value.

9. The method for performing random parameter filter according to claim 1, wherein the one or more rendering system inputs is at least one selected from the group comprising of: screen position and random parameter.

10. The method for performing a random parameter filter according to claim 1, wherein the filtering step further comprises the steps of:

classifying the weight above a certain value to mean that the scene feature has little or no dependency on the one or more random parameters and the weight below a certain value to mean that the scene feature has a significant dependency on the one or more random parameters.

* * * * *